(12) United States Patent
Naik et al.

(10) Patent No.: US 9,087,225 B2
(45) Date of Patent: Jul. 21, 2015

(54) INTEGRADED PACKAGE AUTHENTICATION SYSTEM AND METHOD THEREOF

(75) Inventors: Praful Ramchandra Naik, Hoavar (IN); Manjeet Singh Sahi, Pune (IN); Sukesh Sunder Sheety, Mumbai (IN)

(73) Assignee: BILCARE LIMITED, Pune (IN)

( * ) Notice: Subject to any disclaimer, the term of this patent is extended or adjusted under 35 U.S.C. 154(b) by 0 days.

(21) Appl. No.: 14/238,154

(22) PCT Filed: Aug. 9, 2012

(86) PCT No.: PCT/IN2012/000547
§ 371 (c)(1),
(2), (4) Date: Feb. 10, 2014

(87) PCT Pub. No.: WO2013/061335
PCT Pub. Date: May 2, 2013

(65) Prior Publication Data
US 2014/0326784 A1      Nov. 6, 2014

(30) Foreign Application Priority Data

Aug. 9, 2011   (IN) ............................ 357/MUM/2011

(51) Int. Cl.
  *G07F 17/00*   (2006.01)
  *G06K 5/00*    (2006.01)
  *G06Q 10/08*   (2012.01)

(52) U.S. Cl.
  CPC . *G06K 5/00* (2013.01); *G06Q 10/08* (2013.01)

(58) Field of Classification Search
  USPC ................ 235/375, 380, 462.13, 383, 385, 235/462.45, 472.01
  IPC .............. G06Q 30/02,20/341, 30/06, 20/20, G06Q 10/087, 10/08; G07F 7/1008; G06K 17/00, 17/10693, 7/10881, 7/10851
  See application file for complete search history.

(56) References Cited

U.S. PATENT DOCUMENTS

| | | |
|---|---|---|
| 2005/0144059 A1 | 6/2005 | Schuessler |
| 2006/0053025 A1 | 3/2006 | Mertens |
| 2006/0091208 A1 | 5/2006 | He |
| 2006/0219782 A1 | 10/2006 | Wong |
| 2006/0287927 A1 | 12/2006 | True |
| 2008/0149712 A1 | 6/2008 | Peters |
| 2009/0072019 A1 | 3/2009 | Shibata |
| 2010/0187306 A1 | 7/2010 | Solomon |

FOREIGN PATENT DOCUMENTS

| | | |
|---|---|---|
| FR | 2887055 A1 | 12/2006 |
| GB | 2288171 A | 10/1995 |
| JP | 2005342925 A | 12/2005 |
| WO | 2007133163 A1 | 11/2007 |

*Primary Examiner* — Karl D Frech
(74) *Attorney, Agent, or Firm* — Pillsbury Winthrop Shaw Pittman LLP

(57) ABSTRACT

The present invention related to an integrated object/package authentication system. The invention further relates to a method of identification of and object/package and sequenced authentication of the same based on combination of assigned identification feature and the generated random identification feature (identifiers). The present invention provides method and system where in the combination of assigned identification feature and a randomly generated identifier provides a secured sequenced identification and authentication process to obviate problems associated with reading, calibration and manufacture of random tag/information that are to be disposed on the package/object specifically for creating a signature based on special aspects of the at least two identification information. An identification feature comprises an electrically-insulating host material having pores, wherein at least some of the pores contain a substantially electrically-conducting material which is codeable to encode identification information for identifying the unit dose package.

14 Claims, 3 Drawing Sheets

INTEGRADED PACKAGE AUTHENTICATION SYSTEM AND METHOD THEREOF

CROSS-REFERENCE TO RELATED APPLICATION

Figure 1:
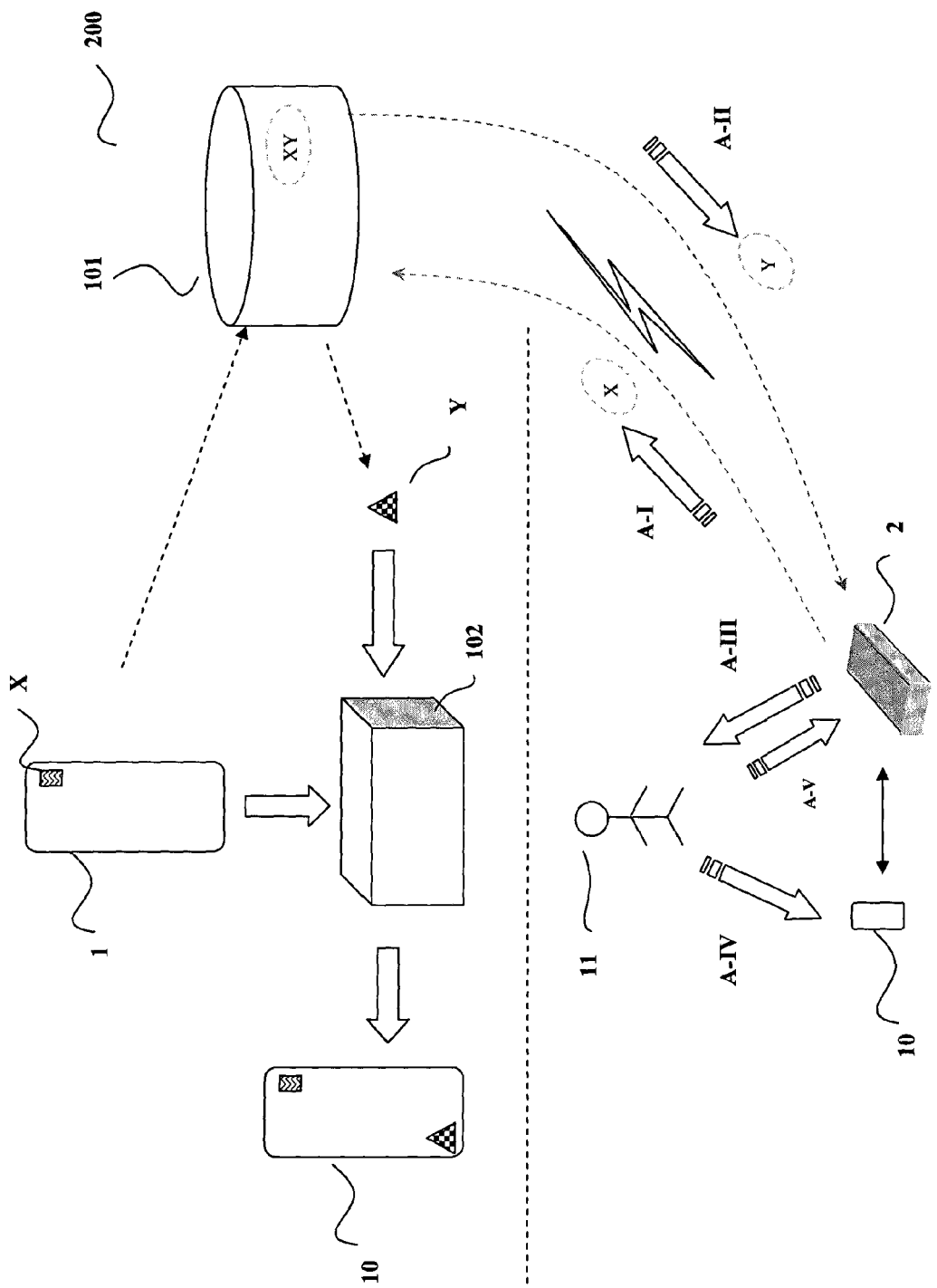

The application is a national phase application corresponding to International Application No. PCT/IN2012/000547 filed Aug. 9, 2012; which claims priority to Indian Patent Application No. 357/MUM/2011 filed Aug. 9, 2011, the entire contents which are incorporated herein by reference.

FIELD OF THE INVENTION

The present invention relates to an integrated object/package authentication system. The invention further relates to a method of identification of an object/package and sequenced authentication of the same based on combination of assigned identification feature and the generated random identification feature (identifiers).

BACKGROUND OF THE INVENTION

Products in the market place are often counterfeited and passed off as genuine causing grievous harm both to the producers, customers and to society at large. Easy identification and authentication of products by users continues to be an unmet need.

Various attempts to achieve the same are reported in the literature, they are as follows:

United States Patent Application 20090218401 discloses a method of verifying the identity of an object which has at least two sets of identification information, each arranged on or incorporated within a different surface of the object and are at a fixed relative spatial position to each other. In order to identify an object, a reading device obtains a first and a second signal from the first and second sets of identification information of the object respectively, determines the relative spatial position between the two sets of information, and determines the signature of the object. However, this technology suffers from a drawback that the determination of the signature needs tedious processing of the signals from identification information. This demands a sophisticated reading device needing cumbersome process, complex algorithms as well as accurate calibration making the manufacture process complex and expensive.

The Kezzler discloses (www.kezzler.com, last accessed on 13 Dec. 2010) secure track and trace suite for supply chain where at its core every single physical product item is provided with an identification code. Every single product item and packaging unit is marked with a unique, never to be repeated encrypted alphanumeric code. The user needs to send this code to a defined service provider via SMS to check the authentication of the package based on the response of the service provider in terms of Yes or No only.

However, this technology suffers from the drawback that the user does not receive any additional information to countercheck existence of the particular number or mark on the package. In this process the authentication process is completed merely by receiving information in terms of receiving SMS from the service provider. In case the service provider system is hacked or tampered/compromised, this authentication process would be invalid.

Review of the prior art reveals following drawbacks:
Manufacturing tags with a set of identification features disposed and configured to a fixed relative spatial position with respect to each other need special equipment and processes resulting in enhanced manufacturing costs;

The process of establishing relationship between two identification information features and arriving at a defined signature based on the interrelation of the signals generated by both the information features also need complex operating algorithms which demand the use of very specialized processors;

Randomized tags further need to be read using fairly complex and expensive readers thereby restricting the application of such solutions to high cost items only;

Reading of randomized tags with desired precision and accuracy demand frequent calibration of the readers making the operations cumbersome;

Existing SMS based systems require a SMS to be sent to a particular defined number of service centre by the end user and confirmation of the authentication is then sent to the user by the service centre. Such systems suffer from the weakness that the user has to send SMS to particular number and in response the user receives only status of authentication. The user does not receive any additional information to countercheck existence of the particular number or mark on the package. In this process the authentication process is completed merely by receiving information in terms of receiving SMS from the service provider. In case the service provider system is hacked or tampered, this authentication process would be invalid.

There is a need to develop an integrated identification and authentication real-time secured networked system and method to identify an object and authenticate the same without the involvement of complex and sophisticated reading devices and process employed in the prior art.

The present invention discloses an integrated identification and authentication system comprising of a centralized data processing unit, communication means, manufacturing unit and a user interactive device wherein the centralized processing unit is capable of randomly creating and assigning a secured identifier for an object based on input of an already assigned identification information/feature of the object, simultaneously randomly generating a second identifier, creating an association between the first identifier and the second identifier, storing identifiers and their said associations in the said centralized processing system enabling sequenced identification and authentication process. The method of sequenced identification of an object and further authentication of the same is based on combination of assigned identification feature "X" and a randomly generated identifier "Y". A secured identifier for the object is randomly created and assigned based on the input of an already assigned identification information/feature of the object, wherein this combination enables stage wise validation and authentication of the object. This obviates problems associated with reading, calibration and manufacture of random tag/information that are to be disposed on the object specifically for creating a signature based on special aspects of the at least two identification information.

SUMMARY OF THE INVENTION

The main object of the invention is to provide an integrated authentication system. Further object of the invention is to provide a method of identification of an object and further sequenced authentication of the same based on combination of assigned identification feature and a randomly generated identifier.

Another object of the invention is to integrate an object manufacturing system/packaging system, centralized data processing unit, communication means, and a user interactive device to enable identification and sequenced authentication process of the package/object based on combination of assigned identification feature and a randomly generated identifier.

Another object of the invention is to provide a manufacturing system for the packaging object or object that is integrated with the centralized data processing unit for generating random identifier based on the assigned identification feature of the object and further applying on the object/package.

Another object of the invention is to randomly generate a secured identifier for the object based on the input of an already assigned identification information/feature of the object.

Yet another object of the invention is to provide stage wise validation and authentication of the object based on this combination.

Yet another object of the invention is to obviate problems associated with reading, calibration and manufacture of random tag/information that are to be disposed on the object specifically for creating a signature based on special aspects of the at least two identification information.

Another object of the invention is to create and/or assign identification feature to/on the object. Further object of the invention is to embed hidden digitized information in such identification feature at the time of digitally reading this assigned identification feature.

Further object of the invention is to store the combination of the assigned identification feature and the generated identification feature in the system such that the combination is treated as the signature for authentication.

Further object of the invention is to secure such combination by embedding digitized information in the same.

Further object of the invention is to provide a reading device to read and/or transmit one of the said identification features.

Further object of the invention is to provide central system/server to generate such random combinations, store and interact with the readers in the field.

Further object of the invention is to provide a secure identification information transmission from the said reader to the system by embedding another set of information during transmission process.

Yet another object of the invention is to utilize hand held device such as mobile/cell phone for capturing identification feature and further transmitting the same to the system.

Yet another object of the invention is to provide identification feature that can be read by hand held device such as mobile.

Yet another object of the invention is to send the identification feature from the signature to the reader using secured signal/information.

A further object of the invention is to provide confirmation about authentication of the object to the user based on the said randomly generated identification feature.

Yet another object of the invention is to obviate use of sophisticated accurate and precise readers and their specific calibration during manufacturing process.

Yet another object of the invention is to obviate default use of random/disordered information created based on physical phenomenon.

Thus in accordance the present invention comprises of an integrated identification and authentication system comprising of a centralized data processing unit, communication means, object/package manufacturing system and a user interactive device/reader wherein the centralized processing unit is capable of randomly creating and assigning a secured identifier for an object/package based on input of an already assigned identification information/feature of the object, simultaneously randomly generating a second identifier, creating an association between the first identifier and the second identifier, storing identifiers and their said associations in the said centralized processing system wherein the manufacturing unit fixes the identifiers on the object during the object manufacturing process. Further the integrated object identification and authentication system which comprises of a user interactive device such as a reader to read the identifiers and communicating with the centralized processing system in a secured process to achieve sequenced identification of an object and its authentication.

In one of the embodiments, object with the identifiers is manufactured in process steps as follows:

Object information such as object serial number, manufacturing date, batch number and other relevant information is identified/read/sensed by the manufacturing system and communicated to the centralized system;

a first identification feature is optionally selected from any of the said object information, assigned and affixed/embedded/attached to object a second random identification feature is randomly generated in the said centralized system as soon as the first identification feature is assigned and communicated to the manufacturing system;

the said second identification feature is affixed/embedded/attached on the object immediately after the first identification feature is provided during the object manufacturing process/object packaging process;

the said object information and the combination of the first and second identification features are stored in the said centralized system to correlate the said object with the combination of the said identification information features, The process of sequenced identification and authentication of an object/package at the user end comprises steps of:

user initiated interaction with a reading device that comprises of an identification feature detection and reading means to capture/acquire identification feature of the object wherein a signal reading means is configured with data input, processing, visual display and communicating means, wherein the reading device operates in steps of:

reading/capturing and acquiring the first identification feature from the object;

converting the said feature into digitized signal;

embedding the digital signal with digitized information for securing the same;

transmitting/communicating the said signal to the centralized system wherein the said centralized system operates in steps of:

receiving the secured signal related to the said first identification feature of the object from the reading device;

decoding the embedded information from the said signal to authenticate the said signal;

identifying the corresponding second identification feature from the stored combination created during the object manufacturing process;

converting the said second identification feature in digitized transmittable signal and embedding the said signal with information for securing the same;

transmitting the said embedded signal using said communication means to the said reading device for the user to verify the presence/absence of the second identification feature;

receiving the message/signal from the reading device regarding presence/absence of the said second identification feature on the object, sending a message to the said reading device on the authenticity of the object;
thereby providing a sequenced secured identification and authentication process.

In further aspect of the invention the centralized system operates in steps of
acquiring the said first identification feature in the processing unit of the centralized system;
storing in data storage means of the centralized system one or plurality of second identification features;
inputting the said first identification feature in the process;
assigning serial number to the said second identification features;
generate random number using random number generating process;
identify the said second identification feature corresponding to the generated random number;
store the combination of said first assigned identification feature and the randomly generated second identification feature;
wherein the randomly generated second identification feature is provided/printed/impregnated/affixed on the said object during manufacturing process of the object in a manner to ensure the said combination of the first and second identification feature appears on the said object.

In another aspect of the invention the said reading device is mobile communication means such as cell phone that is used to capture and/or send/communicate message regarding the said first identification feature of the object and further receive the relevant information regarding the said second identification feature, thus carrying out the sequenced authentication process without the use of exclusive reading device.

DETAILED DESCRIPTION OF THE INVENTION

Features and advantages of this invention will become apparent in the following detailed description and the preferred embodiments with reference to the accompanying drawings.

Figure 2:
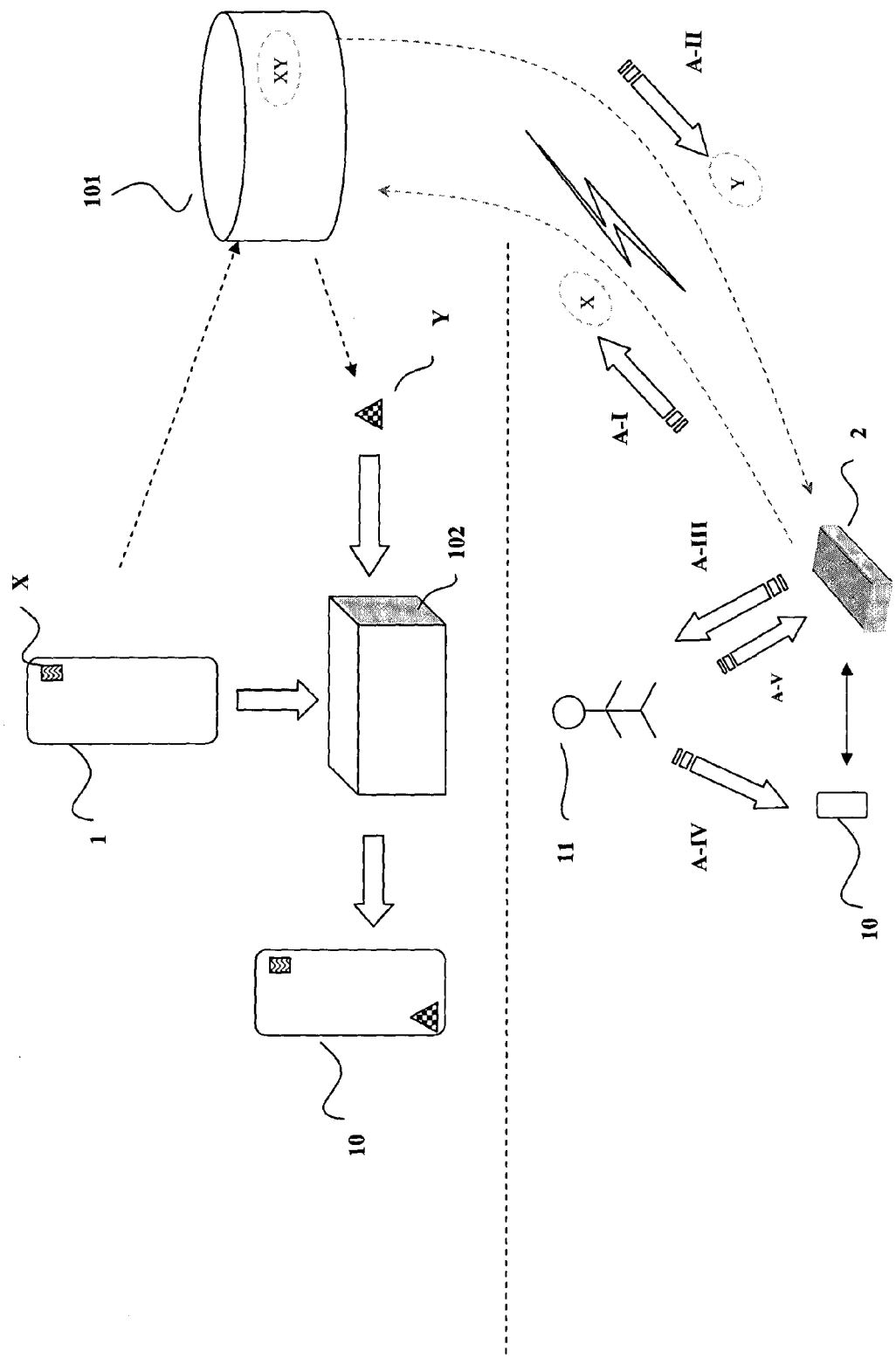
Figure 3:
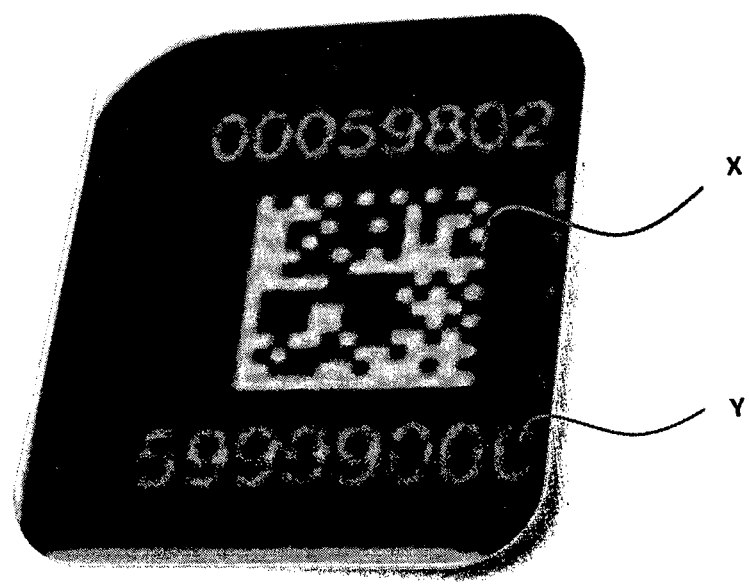

FIG. 1 Schematic of the integrated system (Sheet 1)
FIG. 2 Schematic of the representation of the sequenced identification and authentication process (Sheet 2)
FIG. 3 Identification feature representation (Sheet 3)

FIG. 1 illustrates schematic of an integrated authentication system 200. The system comprises of a centralized remote system 101, communication means adapted on the package/object manufacturing system 102 and a user interactive device/reader 2. The said centralized processing unit 101 is capable of randomly creating and assigning a secured identifier for an object/package 10 based on input of an already assigned identification information/feature of the object, simultaneously randomly generating a second identifier, creating an association between the first identifier and the second identifier, storing identifiers and their said associations in the said centralized remote system 101.

FIG. 2 illustrates schematic representation of sequenced identification and authentication process of the present invention. The system comprises of one or plurality of centralized remote system/s 101, reading device 2, optional object such as package 10. The reading device 2 comprises of an identification feature detection and reading means (not shown) to capture/acquire identification feature X of the object 10. The said reading device 2 is configured with data input, processing and communicating means, visual display means and data input means (not shown). The said processing unit is configured to convert the captured/acquired identification feature signal from the said object 10 to a signal that is embedded with other hidden information for securing the same. The communication means comprises of transmission module adapted to communicably link with the said remote system/s 101 and/or external devices. The said centralized remote system 101 comprises of data storage, processing and communication means (not shown) that is communicably linked with the said reading device/s 2. The central remote system 101 comprises of a serialization engine which generates the first identification feature which is a random serial number/unique ID number generated from a GS1 certified repository/AES 128 bit encryption.

At the manufacturing stage, the object such as package 1 is provided with first identification feature/s X. The information (of the object 1) such as object serial number, manufacturing date, batch number and other relevant information is identified/read/sensed by the manufacturing system from the object and communicated to the centralized system 101. The identification feature X is inputted/fed to the said centralized system 101 that operates to randomly generate second identification feature Y. In the manufacturing process, represented by block 102 as system of manufacture, the said second identification feature Y is printed/provided on the said object 1. The object 10 with two such identification features is deployed in the market. To achieve this function, the centralized server operates in steps of:
assigning first identification feature X to an object 1 such as package;
acquiring the said first identification feature in the processing unit;
storing in data storage means one or plurality of second identification features Y;
inputting the said first identification feature X in the processing means;
assigning serial number to the said second identification features;
generating random number using random number generating process;
identifying the said second identification feature corresponding to the generated random number;
storing the combination of said first assigned identification feature X and the randomly generated second identification feature Y (as represented in the FIG. 1) along with the said information of the object to correlate and confirm that the said combination is for particular object.

In one of the embodiments the identification feature is printed on the product package/objects using a print system that is synchronized with the manufacture line of the product package/object. The said printing system comprise of suitable printing mechanisms which include amongst others dot matrix, inkjet, thermal transfer, ribbon print systems but not limited to it. In case when the identification feature is incorporated onto a label/tag just prior to affixation of the label/tag to the product package/object. The label/tag incorporated with the identification feature gets affixed onto the product package/object using application system that is integrated and synchronized with the manufacture line of the product package/object. In one of the variants of the embodiment, this process is carried out independently-offline after the product package/object is produced.

In another embodiment the generation and printing/affixation/incorporation of the said second identification feature Y is triggered by the serialization engine upon completion of the generation and printing/affixation/incorporation of the first identification feature X. A second set of print system is used to print the second identification feature onto the product package/object at a predefined location or indirectly onto the label/tag on which the first identification feature is affixed/printed/incorporated. The said second identification feature Y can also be printed/affixed/incorporated on a second label/tag which then is applied onto the product/object at a predefined location adjacent/over the label/tag with the said first identification feature X. The said second identification feature Y is then stored along with the first identification feature X in the central repository and is linked with the product package/object details while incorporation or after incorporation of the same onto the product package/object.

In another embodiment wherein the second feature is being printed/affixed/incorporated onto a label/tag online/offline. In this case the label/tag with the second identification feature Y is applied onto the product package/object using application system. It comprises of scanning device/reader which captures the said second identification feature Y and stores it in the predefined location with the said first identification feature X and product package/object details. The print system is integrated with the serialization engine to print the identification features serially on the same tag/label or onto two separate tag/labels on the same spool/two independent spools. The printed tag/label are applied at the same location or at predefined locations on the product/object and the scanning devices capture the details to link both identification features to the product/object details in the central repository.

During authentication process, the reading device 2 operates in steps of identifying the object 10;
reading/capturing and acquiring the identification feature X from the object;
converting the said feature in digitized signal;
embedding this signal with digitized information for securing the same;
transmitting/communicating the said signal to the centralized remote system 101 as represented by arrow indicated by A-I in FIG. 1.

The said centralized remote system 101 further operates to:
receive the secured signal related to the said first identification feature X of the object 10 from the reading device 2 (indicated by a dotted arrow in FIG. 1)
decode the embedded information from the said signal to validate authenticity of the said signal;
identify the corresponding second identification feature Y from the said stored combination;
convert the said second identification feature in digitized transmittable signal and embed the said signal with information for securing the same;
transmit the said embedded signal using said communication means to the said reading device 2 as indicated by process step A-II in the FIG. 1;
receiving the message/signal from the reading device regarding presence/absence of the said second identification feature on the object 10 such as package wherein the user 11 reads the identification feature Y from the said reader 2 (represented by arrow A-III in FIG. 1) and further locates presence/absence of this feature on the said object 10 (this is represented by arrow A-IV in the FIG. 1). Accordingly, the user inputs this information in the reading device (represented by A-V);
sending the message regarding authentication status to the said reading device If the combination of the identification feature is satisfied, that is if corresponding second identification feature Y is present on the object 10, then the message from the said remote system 101 is received about authentication confirmation.

In one of the embodiments there could plurality/set of first identification feature X as well as plurality/set of second identification Y for a particular combination. In another variant there could be plurality of such combination for a particular object.

In one of the embodiments of the invention the object such as package manufacturing system (represented by block 102 in FIG. 1) is configured with the said centralized system 101 wherein information (of the object 1) such as object serial number, manufacturing date, batch number and other relevant information is identified/read/sensed by the manufacturing system for the object and communicated to the centralized system 101;
the said first identification feature X is provided on the object by the system;
the said second random identification feature Y is generated instantaneously in the centralized system 101 and communicated to the manufacturing system 102;
the said second identification feature Y is provided on the object immediately after the first identification feature is provided as the object moves along during manufacture process in the system 102;
the said information of the object and the combination of the first and second identification feature is stored in the said centralized system 101 to correlate particular object with the combination of identification information.

In another aspect of the invention the said reading device 2 is mobile communication means such as cell phone that is used to capture and/or send/communicate message regarding the said first identification feature X of the object and further receive the relevant information regarding the said second identification feature Y; thus carrying out the sequenced authentication process without the use of exclusive reading device.

In one of the preferred embodiment the said random serial number/unique ID number (identification feature) is generated from a GS1 certified repository/AES 128 bit encryption generated by the said serialization engine is affixed/printed/incorporated directly on the product package/object or onto a label/tag which in turn is affixed/applied on the product package/object. In one of the variants of this embodiment, the said label/tag is prefixed with:
unique identifier comprising random material patterns generating magnetic/chemical/electrical signals/output; and/or
unique images/text/patterns visible normally or under particular defined light frequencies/signals In one of the variants of this embodiment the said prefixed features integrated to the identification feature enable additional secured authentication In one of the embodiments the said first and/or second identification information comprises of one or plurality of character/s, images, coded information, physically randomly generated information in combination wherein the said combination is treated as a identification feature. For example a barcode provided with set of numerals below the same is treated as one identification feature in spite of having barcode and numerals as separate entities.

In yet another embodiment the said first and/or second identification feature comprises of a readable layer of randomly distributed material which is capable of encoding identification information, for example a conductive material, magnetized or magnetisable material, semiconductive particle and optically active particles; the second identifier suitably comprises optical information, for example a 1-D or 2-D bar code. In another variant of this embodiment unique identifying information is suitably included on the package in the form of oriented or orientable particles and may relate to for example, the manufacturer of the package or to an individual. Preferably the identification information comprises information derived from a magnetic field and/or an electric field and optionally optical or magneto-optical information. In yet another variant the identification feature comprise of a substantially non-magnetic host material having pores, wherein at least some of the pores contain a substantially magnetic material which is codeable to encode identification information for identifying the product package or a unit dose package. Further the identification feature may comprise a substantially electrically-insulating host material having pores, wherein at least some of the pores contain a substantially electrically-conducting material which is codeable to encode identification information for identifying the unit dose package. Desirably, the electrically-conducting material is connectable to a voltage source.

In one of the embodiments the first identification feature X is incorporated into a form of barcode which makes it possible to use a normal mobile device with a camera to snap the code with inbuilt decoding application loaded onto the mobile. The second identification feature Y also consist of a human readable serial no which could then be text messaged using a normal mobile at a predefined short code message service number. The service number in turn provides the second identification feature details on the product/object via return message enabling the verification and authentication process.

FIG. 3 illustrates one of the embodiments of the identification features. The first identification feature X in this embodiment is in the form of an encoded unique barcode/data matrix serial number. The second identification feature Y is in the form of a human readable text. This number is a random text 0005980259999000 in the illustration. In one of the variants, this second identification feature is generated using the AES 128 bit encryption. The unique barcode serial number is generated using GS1 certified repository. In use, the user captures the identification feature by taking image of X by say a mobile phone and is then transmitted to the said centralized system 101 as shown in FIG. 1. The system in turn sends via SMS to the user mobile phone already stored second identification feature Y in terms of the text (0005980259999000). The user validates this number with the one provided therein to ensure sequenced authentication.

In one of the embodiments, the said reading device is a mobile phone wherein SMS/multimedia message is sent to the said remote system from the mobile phone In yet another embodiment the centralized system randomly creates and assigns a secured identifier/s for an object/package, further randomly generating second and/or additional/plurality of identifier/s, creating an association between the identifiers, storing identifiers and their said associations in the said centralized remote system.

In yet another embodiment the said reading device is mobile communication means such as cell phone that is used to capture and/or send/communicate message regarding the said first identification feature of the object and further receive the relevant information regarding the said second identification feature, thus carrying out the sequenced authentication process without the use of exclusive reading device.

It is evident that the combination of combination of assigned identification feature and a randomly generated identifier provides a secured sequenced identification and authentication process to obviate problems associated with reading, calibration and manufacture of random tag/information that are to be disposed on the object specifically for creating a signature based on special aspects of the at least two identification information.

We claim:

1. An integrated package authentication system comprising:
   a centralized remote system, communication means, object/package manufacturing system and a user interactive device,
   wherein the centralized system is configured to:
      randomly create and assign a first secured identifier for an object based on input of an already assigned identification information of the object/package,
      simultaneously randomly generate a second identifier,
      create an association between the first identifier and the second identifier, and
      store the first identifier, the second identifier and their said association in the said centralized remote system.

2. An integrated package authentication system as claimed in claim 1, wherein the said user interactive device is configured to read the first and the second identifiers and communicate with the centralized remote system in a secured process to achieve sequenced identification of an object and its authentication.

3. An integrated package authentication system as claimed in claim 1, wherein the said user interactive device comprises a mobile communication device that is configured to capture and/or communicate a message regarding the said first identifier of the object and further receive information regarding the said second identifier to enable a sequenced authentication process without using an exclusive dedicated reading device.

4. An integrated package authentication system as claimed in claim 1, wherein the said first identification feature is incorporated into a form of barcode or data matrix which makes it possible to use a mobile device with a camera to read the first identifier with an inbuilt decoding application associated with the mobile device wherein the said second identifier consists of a human readable serial number which is communicated using a mobile phone at a predefined short code message service number, the service number in turn provides the second identifier on the object via a return message enabling a verification and authentication process.

5. An integrated package authentication system as claimed in claim 1, wherein the said first and/or second identifier comprises of one or a plurality of character/s, images, coded information, physically randomly generated information in combination, wherein the said combination is treated as an identification feature.

6. An integrated package authentication system comprising:
   a centralized remote system, communication means, object manufacturing system and a user interactive device,
   wherein the centralized system is configured to:
   randomly create and assign a first secured identifier for an object based on input of an already assigned identification information of the object,
   simultaneously randomly generate a second identifier,
   create an association between the first identifier and the second identifier, and
   store the first identifier, the second identifier and their said association in the said centralized remote system, wherein the said first and/or second identifier comprises of a readable layer of randomly distributed material which is capable of encoding identification information, wherein the material comprises one or more of a conductive material, a magnetized or magnetisable material, semiconductive particles optically active particles;

and wherein the second identifier comprises optical information.

7. An integrated package authentication system as claimed in claim 1, wherein the central remote system (101) comprises of a serialization engine which generates identification feature which is a random serial number/unique ID number generated from a GS1 certified repository/AES 128 bit encryption and is:
   directly affixed/printed/incorporated on the product package/object; or,
   affixed/printed/incorporated onto a label/tag which in turn is affixed/applied on the product package/object.

8. An integrated package authentication system as claimed in claim 1, wherein the said label/tag is prefixed with unique identifier comprising random material patterns generating magnetic/chemical/electrical signals/output or unique images/text/patterns visible normally or under particular defined light frequencies/signals.

9. An integrated package authentication system as claimed in claim 1 wherein the said identification feature is printed on the product package/objects using a print system comprising printing mechanisms selected from dot matrix, inkjet, thermal transfer, ribbon print systems and which is synchronized with the manufacture line of the product package/object.

10. An integrated package authentication system as claimed in claim 1 wherein the said identification feature is printed on the onto the said label/tag just prior to affixation of the label/tag to the product package/object wherein the said label/tag incorporated with the identification feature is affixed/applied onto the product package/object using application system that is configured with the manufacture line of the product package/object or independently—offline after the product package/object is produced.

11. An integrated package authentication system comprising:
   a centralized remote system, communication means, object manufacturing system and a user interactive device,
   wherein the centralized system is configured to:
   randomly create and assign a first secured identifier for an object based on input of an already assigned identification information of the object,
   simultaneously randomly generate a second identifier,
   create an association between the first identifier and the second identifier, and
   store the first identifier, the second identifier and their said association in the said centralized remote system,
   wherein generation and printing/affixation/incorporation of the said second identification feature is triggered by the serialization engine upon completion of the generation and printing/affixation/incorporation of the first identification feature and the said second identification feature is generated and printed/affixed/incorporated directly onto the product package/object using a second set of print system a predefined location or indirectly onto the label/tag on which the first identification feature is affixed/printed/incorporated or on a second label/tag which then is applied onto the product package/object at a predefined location adjacent/over the already applied label/tag with the said first identification.

12. An integrated package authentication system as claimed in claim 11, wherein the second feature is being printed/affixed/incorporated onto a label/tag online/offline;
   the said label/tag with the said second identification feature is applied onto the product package/object using application system
   wherein the application system comprises of scanning device/reader which captures the said second identification feature and stores it in the predefined location in the said centralized system with the said first identification feature and product package/object details
   wherein the print system is integrated with the serialization engine to print the identification features serially on the same tag/label or onto two separate tag/labels on the same spool/two independent spools
   wherein the said printed tag/label are applied at the same location or at predefined locations on the product package/object and the scanning devices capture the details to link both identification features to the product package/object details in the said centralized system.

13. An integrated package authentication system as claimed in claim 1
   wherein the manufacturing unit manufacturing the object/package deploys the entire system for generation/affixation/incorporation of the identifiers on the object/package or gets the pre generated and printed identifiers and then fixes/applies them on the object/package during the object/package manufacturing process.

14. An integrated package authentication system as claimed in claim 6, wherein a unique identifying feature is included on the package, the unique identifying feature comprising:
   oriented or orientable particles, wherein identification information comprises information derived from one or more of a magnetic field, an electric field, and an optical information, and a magneto-optical information;
   a substantially non-magnetic host material having pores, wherein at least some of the pores contain a substantially magnetic material which is codeable to encode identification information for identifying the product package or a unit dose package; and
   a substantially electrically-insulating host material having pores, wherein at least some of the pores contain a substantially electrically-conducting material which is codeable to encode identification information for identifying the unit dose package.

* * * * *